United States Patent [19]

Besemann

[11] Patent Number: 4,977,788
[45] Date of Patent: Dec. 18, 1990

[54] APPARATUS FOR ADJUSTING THE POSITIONS OF COMPONENTS IN MACHINES

[75] Inventor: Alfred Besemann, Hamburg, Fed. Rep. of Germany

[73] Assignee: E.C.H. Will GmbH, Hamburg, Fed. Rep. of Germany

[21] Appl. No.: 317,728

[22] Filed: Mar. 2, 1989

[30] Foreign Application Priority Data

Mar. 9, 1988 [DE] Fed. Rep. of Germany ....... 3807730

[51] Int. Cl.$^5$ ........................ F16H 25/24; F16H 1/18; F16D 11/06
[52] U.S. Cl. .............................. 74/424.8 R; 74/89.15; 192/26
[58] Field of Search ............... 74/89.15, 424.8 R, 841, 74/527; 192/17 R, 28, 26, 36; 173/141

[56] References Cited

U.S. PATENT DOCUMENTS

| 3,164,029 | 1/1965 | Martens | 74/424.8 R |
| 3,656,358 | 4/1972 | Kopp | 74/89.15 |
| 3,670,583 | 6/1972 | Leming | 74/89.15 |
| 4,250,762 | 2/1981 | Weatherby | 74/424.8 R |
| 4,434,677 | 3/1984 | Linley, Jr. | 74/89.15 |

Primary Examiner—Rodney H. Bonck
Assistant Examiner—Winnie Yip
Attorney, Agent, or Firm—Peter K. Kontler

[57] ABSTRACT

An apparatus for simultaneously or independently adjusting components in a machine wherein the components are movable along a track to change the positions of tools, tool holders or other mobile parts. The apparatus has an indexible feed screw which is parallel to the track and mates with discrete nuts, one for each adjustable component and each rotatably connected to the respective component. The nut has axially parallel grooves for reception of pivotable pallets on the nuts to establish torque-transmitting connections between the feed screw and selected nuts. The nuts can be arrested against rotation with the feed screw by locking bolts which are engageable with selected teeth of annuli of teeth on the nuts. A nut will shift the respective component along the track when the respective pallets are expelled from the grooves of the feed screw and the nut is arrested so that it cannot rotate with the feed screw.

17 Claims, 3 Drawing Sheets

APPARATUS FOR ADJUSTING THE POSITIONS OF COMPONENTS IN MACHINES

BACKGROUND OF THE INVENTION

The invention relates to improvements in apparatus for adjusting the positions of selected components in machines, particularly for adjusting the positions of tools and/or tool holders in machines including production lines and other arrangements wherein individual or two or more components must be adjusted independently of or jointly with each other. Still more particularly, the invention relates to apparatus which can be used with advantage in machines wherein one or more components which necessitate frequent, regular or sporadic adjustments are guided for movement along predetermined paths, e.g., along straight or otherwise configurated tracks.

It is often necessary to adjust the position of positions of one or more components (e.g., tool holders) which are movable longitudinally of a common track or along discrete paths. The adjustment can involve a movement of one component relative to each other component, joint movements of two or more components relative to the remaining component or components (either through identical distances or through different distances), or joint movements of all components through identical or different distances. For example, one or more tool holders are likely to require adjustment along a given path in order to account for differences in the dimensions of successively treated workpieces. Examples of such machines are paper making and/or processing machines, grinding machines, special machine tools and many others. A complex machine, e.g., a machine tool or a production line, will often utilize a large number of adjustable components each of which must be free to assume any one of a number of different positions relative to its track, either jointly with or relative to the other component or components. This contributes to flexibility and versatility of the machine which employs the adjustable components.

OBJECTS OF THE INVENTION

An object of the invention is to provide a novel and improved apparatus which can accurately select the positions of one or more adjustable components in a machine or the like, either jointly with or independently of each other.

Another object of the invention is to provide an apparatus which can be installed in existing machines as a superior substitute for heretofore known adjusting apparatus.

A further object of the invention is to provide the apparatus with novel and improved means for reliably arresting one or more adjustable components in selected positions for any desired intervals of time.

An additional object of the invention is to provide the apparatus with novel and improved means for advancing one or more selected components through selected distances within short intervals of time.

Still another object of the invention is to provide the apparatus with novel and improved means for controlling the sequence and extent of adjustments of two or more components along a common track or along several discrete tracks.

A further object of the invention is to provide a novel and improved feed screw for use in the above outlined apparatus.

Another object of the invention is to provide the apparatus with a novel and improved nut which mates with the improved feed screw.

SUMMARY OF THE INVENTION

The invention is embodied in an apparatus for changing the position of at least one adjustable component, such as a tool or tool holder in a machine tool. The improved apparatus comprises a rotary feed screw which is mounted for angular movement but is held against axial movement, a motion receiving member for the adjustable component (such member can form an integral or separable part of the adjustable component), a rotary nut which mates with the feed screw and is connected with the motion receiving member for movement with the motion receiving member in the axial direction of the feed screw (i.e., the motion receiving member need not rotate with but is compelled to share translatory movements of the nut in the axial direction of the feed screw), engageable and disengageable coupling means for non-rotatably connecting the nut to the feed screw so that rotation of the feed screw does not entail any movement of the nut in the axial direction of the feed screw when the coupling means is engaged to hold the nut against rotation relative to the feed screw and vice versa, and engageable and disengageable arresting means which serves to block rotation of the nut with the feed screw so that the nut and the motion receiving member are compelled to move axially of the feed screw in response to rotation of the feed screw in engaged condition of the arresting means (i.e., when the nut is held against rotation with the feed screw.

The apparatus preferably further comprises control means for engaging and disengaging the coupling means and the arresting means in a predetermined sequence, particularly in such a way that engagement of the arresting means precedes disengagement of the coupling means and disengagement of the arresting means follows engagement of the coupling means.

The nut can be rotatably journed in or on the motion receiving member.

In accordance with a presently preferred embodiment, the coupling means comprises a plurality of axially parallel external grooves which are machined into or otherwise formed in the external surface of the feed screw, and mobile coupling elements (e.g., in the form of pallets) which are mounted on the nut for movement into and from the grooves. The coupling elements can be mounted on an end face of the nut and are spaced apart from each other in the circumferential direction of the feed screw. Torsion springs or other suitable means can be provided for biasing the coupling elements toward the peripheral surface of the feed screw so that, when the feed screw turns relative to the nut and/or vice versa, at least one of the coupling elements is bound to enter a groove and to thus hold the nut against rotation relative to the feed screw after the extent of angular movement of the nut and feed screw relative to each other reaches a predetermined value.

The apparatus further comprises means for expelling the coupling elements from the grooves of the feed screw. Such expelling means can comprise means for simultaneously urging all of the coupling elements to positions outside of the grooves.

The coupling elements can form part (e.g., the first arms) of levers which are pivotably mounted on the nut and each of which has a second arm. The expelling means can include an elastic member (e.g., a loop-shaped leaf spring) which surrounds the levers, and means for simultaneously engaging the elastic member with the second arms of all levers to thereby expel the coupling elements from the grooves of the feed screw. The coupling means can be designed in such a way that penetration of a single coupling element into a groove of the feed screw suffices to establish a reliable torque-transmitting connection between the nut and the feed screw.

The arresting means can comprise an annulus of alternating teeth and tooth spaces on the nut, and a locking bolt which is movable into and from a selected tooth space to thereby hold the nut in a predetermined angular position with reference to the motion receiving member. The control means can comprise a mobile support for the locking bolt of the arresting means and for the aforementioned engaging means. Such engaging means is designed to tighten the elastic member of the expelling means around the levers of the coupling means. The tightening means can be rigid with the support, and the control means can further comprise means (e.g., a leaf spring) for movably mounting the locking bolt on the support so that the tightening means is movable relative to the locking bolt and vice versa.

The apparatus preferably further comprises means for indexing the feed screw stepwise through angles of predetermined magnitude. The indexing means can include a stepping motor which drives the feed screw by way of a suitable transmission. The control means can be designed to effect engagement or disengagement of the coupling means and/or arresting means only after completion of indexing of the feed screw through at least one full angle of predetermined magnitude. Each angle can equal 360/n wherein n is a whole number exceeding one. The arresting means preferably comprises n teeth and n tooth spaces. The coupling means preferably comprises r grooves in the feed screw and s coupling elements on the nut. The number of grooves and coupling elements is preferably selected in such a way that n equals r times s.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF PREFERRED EMBODIMENTS

Figure 1:
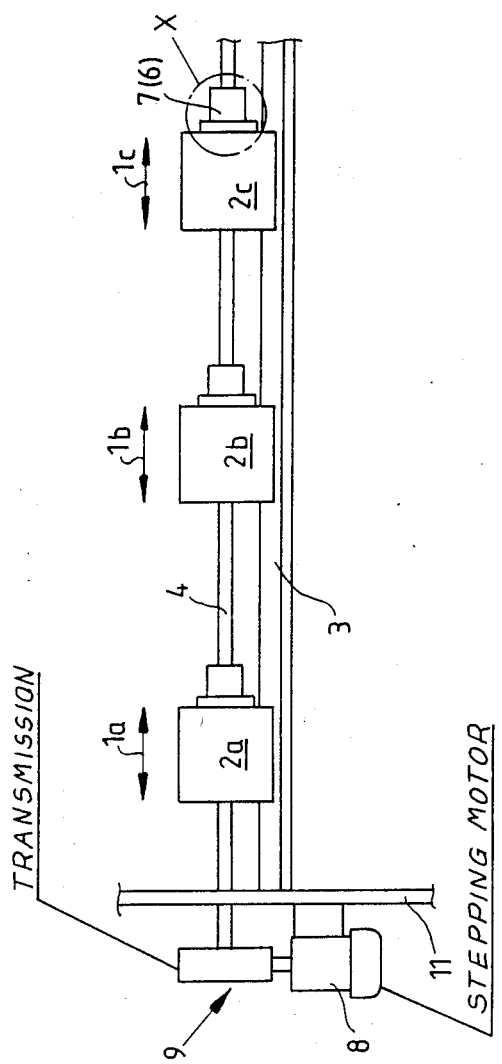
FIG. 1 a schematic elevational view of an apparatus which embodies the invention and wherein the feed screw is designed to adjust the positions of three discrete components, either simultaneously or independently of each other.

FIG. 1 shows a portion of a machine with three adjustable components 2a, 2b, 2c which are reciprocable along a track 3 in directions indicated by double-headed arrows 1a, 1b and 1c, respectively. The improved apparatus serves to move the component 2a, 2b and/or 2c to any one of a desired (e.g., infinite) number of positions along the track 3. Such movements can take place simultaneously or independently of each other.

The apparatus comprises an elongated rotary feed screw 4 which is rotatably journalled in a frame 11 and can be indexed stepwise through angles or increments of predetermined magnitude by indexing means including a stepping motor 8 and a transmission 9, e.g., a bevel gear transmission or a worm drive. The apparatus further comprises a nut 6 for each of the components 2a to 2c, and each nut is rotatably journalled in a motion receiving member 7 of the respective component. Each component can constitute a tool holder or a tool (e.g., a carriage for one or more tools in a material removing, material severing or other processing machine). The motion receiving members 7 can be said to constitute housings or bearings for the respective nuts 6, and each such member 7 can form an integral part of the respective component 2a, 2b or 2c.

The exact construction of the motor 8 forms no part of the invention. It is preferred to employ a motor which is designed to index the feed screw 4 n times in order to cause the feed screw to complete a full revolution about its own axis (n can equal twelve). The illustrated motor 8 is mounted on or in the frame 11. The feed screw 4 is mounted in such a way that it can rotate about its own axis but is held against axial movement relative to the frame 11 and track 3.

Figure 2:
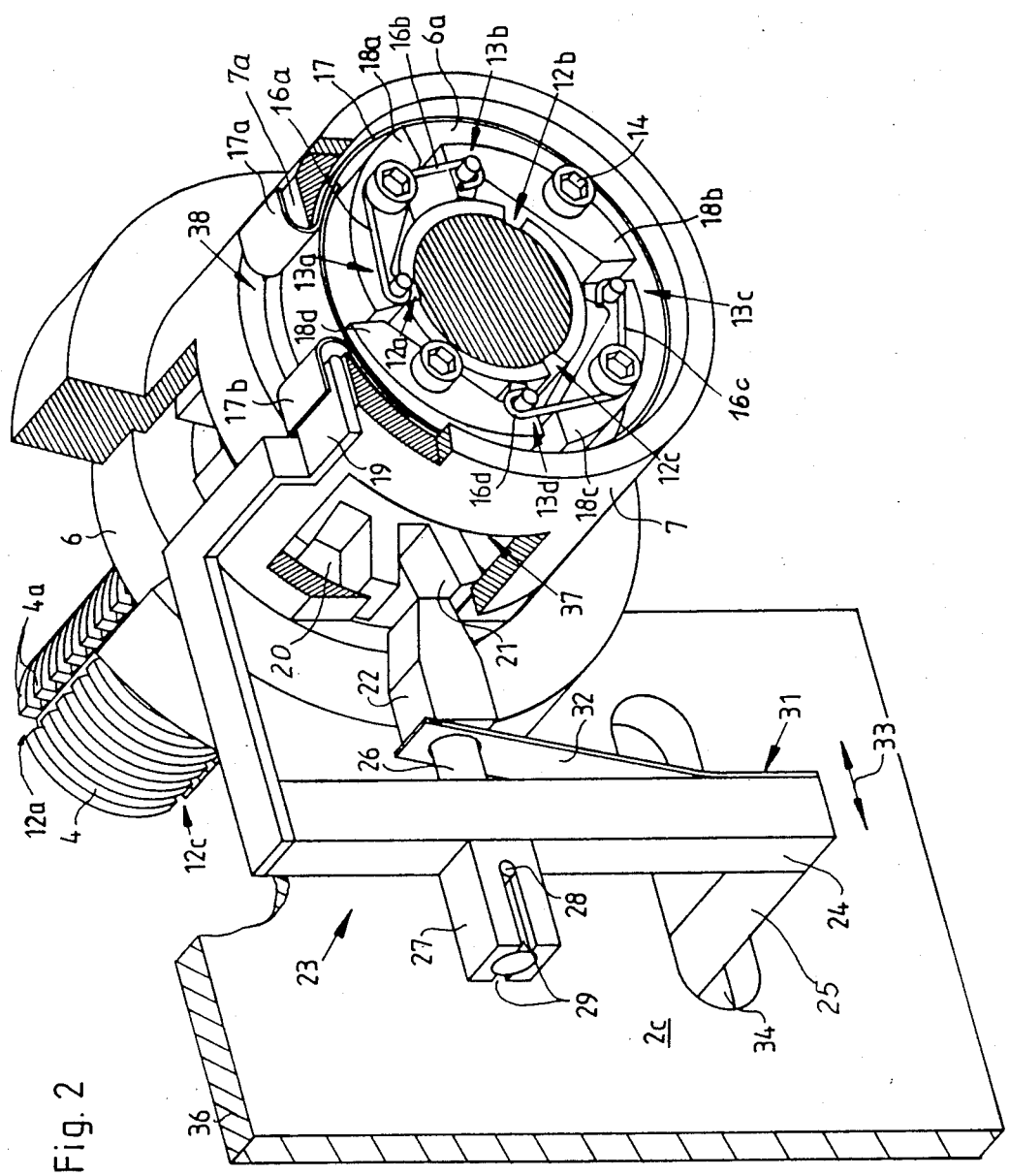
FIG. 2 is an enlarged perspective view of the detail within the phantom-line circle X in FIG. 1, with portions of the motion receiving member broken away and with the arresting means in disengaged condition while the coupling means holds the nut against rotation relative to the feed screw.
Figure 3:
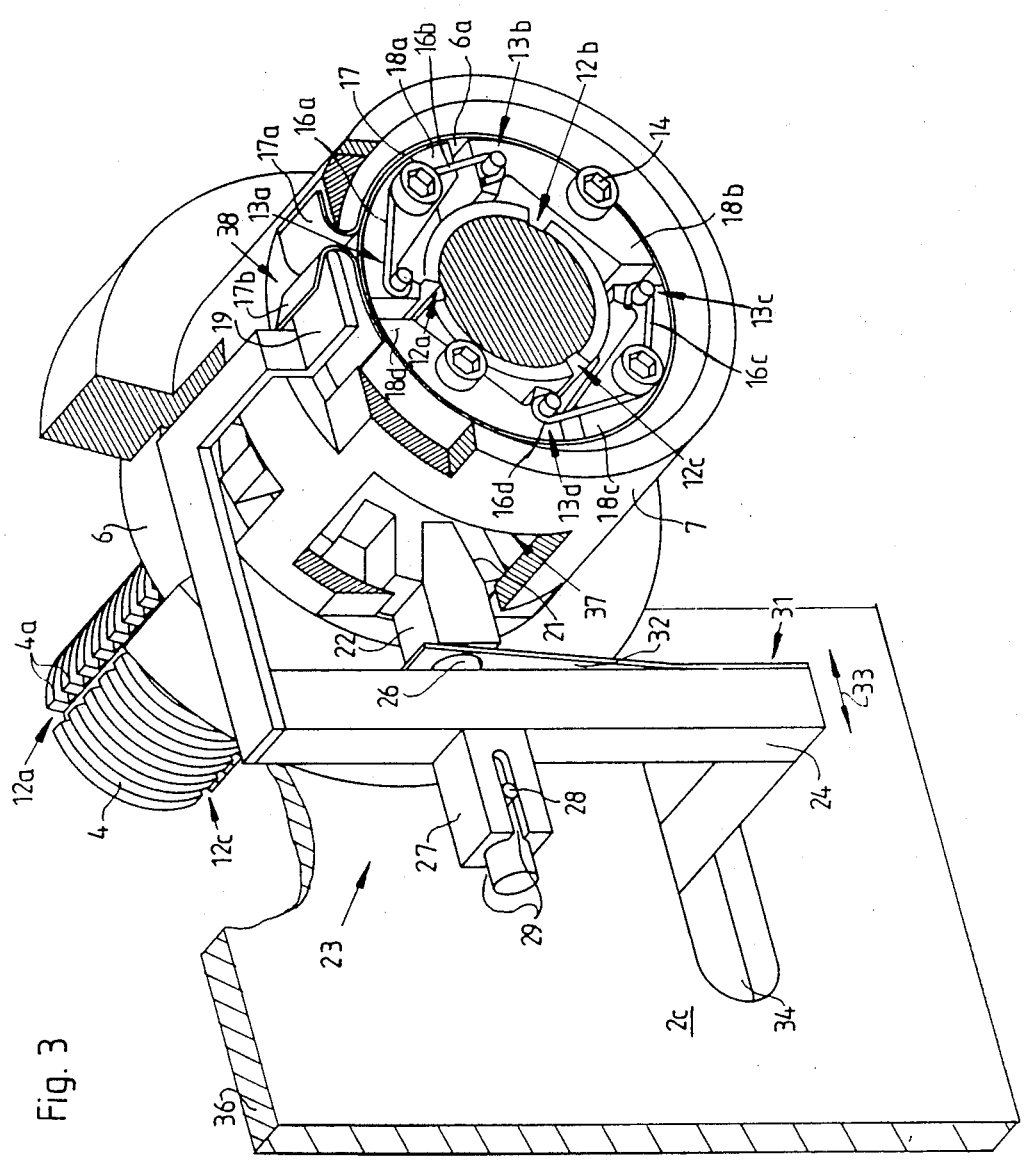
FIG. 3 shows the structure of FIG. 2, with the arresting means engaged and the coupling means in disengaged condition.

The details of that portion of the apparatus which is used to move the component 2c along the track 3 are shown in FIGS. 2 and 3. It is assumed that the motor 8 is set up to turn the feed screw 4 stepwise through angles of 30°, i.e., that n equals twelve. The construction of those portions of the apparatus which serve to adjust the positions of the components 2a and 2b are or can be identical to the structure which is shown in FIGS. 2 and 3.

The feed screw 4 has an external thread 4a mating with the internal thread of the nut 6 which is shown in FIGS. 2 and 3. The nut 6 can rotate relative to but cannot move axially of the motion receiving member or housing 7 of the component 2c, i.e., the member 7 is compelled to move axially of the feed screw 4 (and hence along the track 3) when the feed screw is caused to rotate relative to the nut 6. On the other hand, the axial position of the nut 6 and the position of the member 7 relative to the track 3 remain unchanged when the nut is compelled to rotate with the feed screw 4. As can be seen in FIGS. 2 and 3, the mounting of the nut 6 is such that its peripheral surface is completely or nearly completely surrounded by the member 7.

The means for coupling the nut 6 to the feed screw 4 comprises three axially parallel grooves 12a, 12b, 12c which are machined into or otherwise formed in the external surface of the feed screw, and four coupling elements 13a, 13b, 13c, 13d which are movably mounted at the front end face 6a of the nut 6. The grooves 12a–12c and elements 13a–13d are equidistant from each other in the circumferential direction of the feed screw 4 nut 6. It will be noted that the number (r=3) of grooves 12a–12c times the number (s=4) of coupling elements 13a–13c equals n (number of incremental movements which must be completed by the feed screw 4 to turn through 360°). The coupling elements 13a–13d constitute pallets or clicks and are integral with the respective arms of four levers which are pivotable on shafts 14 secured to and extending beyond the front end face 6a of the nut 6. The shafts 14 carry torsion springs 16a, 16b, 16c, 16d which serve as a means for permanently urging the coupling elements 13a–13d toward the peripheral surface of the feed screw 4. Each of the aforementioned levers further comprises a second arm 18a, 18b, 18c, 18d which is integral with the respective coupling element 13a–13d and can be engaged by an elastic biasing member in the form of a looped torsion spring 17 which surrounds the four levers at the front end face 6a of the nut 6.

The distribution of the grooves 12a–12c and coupling elements 13a–13d is such that a coupling element can penetrate into one of the grooves 12a–12c (in order to couple the nut 6 to the feed screw 4) only when the feed screw 4 has completed one or more incremental advances through angles of 30°. In view of the aforementioned number of grooves 12a–12c and coupling elements 13a–13d, and in view of uniform distribution of grooves and coupling elements in the circumferential direction of the feed screw 4, one of the coupling elements will penetrate into one of the grooves whenever the feed screw completes an angular movement through 30° with reference to the nut 6.

If desired, the number of grooves in the peripheral surface of the feed screw 4 can be increased to four and the number of coupling elements on the nut 6 can be reduced to three. This would still ensure that the nut 6 could be coupled to the feed screw 4 in response to each angular displacement of the feed screw through 30° (provided, of course, that the nut does not share the angular movement of the feed screw). Thus, the number of those angular positions of the feed screw 4 relative to the nut 6 in which the nut can be coupled to the feed screw equals the number of grooves times the number of coupling elements if the product of these numbers matches that number of incremental angular movements of the feed screw which are necessary to rotate the feed screw through 360°.

The leaf spring 17 is designed to simultaneously move all of the coupling elements 13a to 13d to positions in which the coupling elements are outwardly adjacent the periphery of the feed screw 4 and none of the coupling elements extend into the grooves 12a–12c. This is desirable and advantageous because it is not necessary to ascertain which of the coupling elements 13a–13d extends into one of the grooves 12a–12c when it becomes necessary to disengage the coupling means including the grooves and the coupling elements. In other words, it is not necessary to memorize and/or otherwise ascertain the angular positions of the nut 6 and feed screw 4 relative to each other when the coupling between these parts is to be disengaged.

When the size of the loop which is formed by the leaf spring 17 is reduced, the spring 17 bears upon the arms 18a–18d and simultaneously pivots the respective levers clockwise (as viewed in FIG. 2) from the positions which are shown in FIG. 2 to the positions of FIG. 3. This results in expulsion of the coupling element 13a from the groove 12a so that the feed screw 4 is free to rotate relative to the nut 6. The expelling means which includes the leaf spring 17 further comprises means for simultaneously engaging the spring 17 with all of the second arms 18a–18d, and such engaging means includes a member 19 which is reciprocable in directions indicated by a double-headed arrow 33. One end portion 17a of the spring 17 is bent around a wedge-like portion 7a of the member 7 in a window 38, and the other end portion 17b of the spring 17 also extends through the window 38 and is bent around the adjacent end portion of the engaging member 19. When the latter assumes the position of FIG. 2, the torsion springs 16a to 16d are free to bias the coupling elements 13a–13d toward the periphery of the feed screw 4 in order to ensure that one of the coupling elements will penetrate into one of the grooves 12a–12c as soon as the feed screw 4 completes an angular movement through 30°.

It is clear that the end portion 17a of the spring 17 can be attached to the member 7 in a different way, and that the end portion 17b of the spring 17 can receive motion from the engaging member 19 in a manner other than that shown in FIGS. 2 and 3.

The apparatus further comprises means for arresting the nut 6 so that the latter is held against movement (i.e., against rotation) relative to the motion receiving member 7. The arresting means includes an annulus of alternating teeth 21 and tooth spaces 20 at the periphery of the nut 6, and a locking bolt 22 which is movably mounted on a support 24 forming part of a control unit 23 and being rigid with the aforementioned engaging member 19 for the leaf spring 17. The number of teeth 21 and tooth spaces 20 equals n, i.e., the bolt 22 can enter a tooth space 20 whenever the nut 6 turns relative to the member 7 through an angle of 30° or a whole multiple of 30°. In other words, the arresting means including the teeth 21 and the bolt 22 can become effective whenever the nut completes an angle of 30°, 60°, etc.

The means for movably mounting the locking bolt 22 on the support 24 of the control unit 23 comprises a leaf spring 32 which is installed in stressed condition so that it tends to bias the locking bolt 22 in a direction toward engagement with the adjacent teeth 21 on the nut 6. The bolt 22 has a shank 26 which extends through a hole or bore of the support 24 and into a bearing 27 which is affixed to or forms part of the support. In order to prevent rotation of the shank 26 about its own axis (and an undesirable change of orientation of the bolt 22 relative to the teeth 21 and tooth spaces 20), the shank 26 is provided with a diametrically extending guide pin 28 extending into two slots 29 of the bearing 27. The support 24 has an extension or leg 25 which extends through an elongated slot 34 of a wall member 36 forming part of or secured to the component 2c. The locus of attachment of the leaf spring 32 to the support 24 is shown at 31. This spring enables the locking bolt 22 to move relative to the engaging member 19 for the leaf spring 17 and vice versa. The purpose of the guide pin 28 and slots 29 is to ensure that the locking bolt 22 invariably remains in an optimum orientation for penetration into one of the tooth spaces 20 in response to angular movement of the nut 6 through 30° or a multiple of 30°.

The means for shifting the extension or leg 25 of the support 24 relative to the wall member 36 can include a fluid-operated motor (e.g., a hydraulic or pneumatic cylinder and piston unit) which is not shown in the drawing. Instead of being shiftable (reciprocable) in the directions of the double-headed arrow 33, the support 24 of the control unit 23 can be mounted on the wall member 36 or on another part of the component 2c for pivotal movement about a fixed axis. All that counts is to ensure that the engaging member 19 can be moved in directions to tighten the leaf spring 17 around the arms 18a-18d or to permit the torsion springs 16a-16d to maintain the coupling elements 13a-13d in the positions of FIG. 3, and that the locking bolt 22 can be moved into and out of a selected tooth space 20.

The feature that the leaf spring 32 movably mounts the locking bolt 22 on the support 24 ensures that the movement of the engaging member 19 toward the end portion 17a of the spring 17 can precede penetration of the bolt 22 into a tooth space 20 as well as that penetration of the bolt 22 into a tooth space 20 can precede a movement of the engaging member 19 from the position of FIG. 2 toward the position of FIG. 3. In other words, the coupling means including the grooves 12a-12c and coupling elements 13a-13c can be engaged prior to engagement of the arresting means including the bolt 22, teeth 21 and tooth spaces 20, and the other way around. This is desirable for reliable operation of the improved apparatus.

The locking bolt 22 can penetrate into a selected tooth space 20 by extending through a window 37 of the member 7, and the end portions 17a, 17b of the spring 17 extend into and/or outwardly beyond the aforementioned window 38 in the member 7.

The mode of operation of that portion of the improved apparatus which is shown in FIGS. 2 and 3 is as follows:

In order to adjust the component 2c, i.e., to change the position of this component relative to the track 3, the motor 8 is started to turn the feed screw 4 by way of the transmission through one or more angles of 30° each. At such time, the nut 6 is non-rotatably coupled to the feed screw 4 because one (13a) of the coupling elements 13a-13d extends into one (12a) of the grooves 12a-12c in the feed screw. This is shown in FIG. 2. At such time, the support 24 of the control unit 23 is maintained in the retracted position so that the locking bolt 22 is disengaged from the teeth 21 and the engaging member 19 permits the spring 17 to expand under the action of the torsion springs 16a-16d which are free to urge the respective coupling elements 13a-13d toward the periphery of the feed screw 4. Thus, the nut 6 is compelled to turn with the feed screw 4 and the nut is also free to turn relative to the member 7 of the component 2c. Therefore, the member 7 and the component 2c are not compelled to move along the track 3.

If the position of the component 2c relative to the track 3 is to be changed, either in a direction toward the transmission 9 or in the opposite direction, it is necessary to move the support 24 from the position of FIG. 2 to the position of FIG. 3 so that the engaging member 19 compels the spring 17 to expel the coupling element 13a from the groove 12a and to simultaneously ensure that the coupling element 13b, 13c or 13d is prevented from entering one of the grooves 12a-12c. This takes place while the feed screw 4 is not rotated and shortly or immediately after the locking bolt 22 penetrates into the registering tooth space 20. Such position of the locking bolt 22 is shown in FIG. 3, i.e., the nut 6 is uncoupled from the feed screw 4 and the nut is held against rotation relative to the component 2c and its motion receiving member 7. If the motor 8 is then started to rotate the feed screw 4, the latter rotates relative to the nut 6 and thus compels the nut and the member 7 to move longitudinally of the track 3, either toward or away from the transmission 9 (depending upon the selected direction of rotation of the feed screw by the motor 8 through the medium of the transmission 9). The lead of the thread 4a on the feed screw 4 and the extent of angular displacement of the feed screw by the motor 8 determine the extent of linear movement of the component 2c along the track 3.

When the component 2c reaches the desired position, the motor 8 is arrested and the control unit 23 causes its support 24 to move from the position of FIG. 3 back to the position of FIG. 2. As a result of movement of the support 24 away from the nut 6, the engaging member 19 enables the torsion springs 16a-16d to dissipate energy and to enlarge the loop which is formed by the spring 17 so that the coupling elements 13a-13d are free to move toward the periphery of the feed screw 4 and one of the coupling elements penetrates into one of the grooves 12a-12c. Thus, the nut 6 is then coupled to the feed screw 4 because the coupling including the grooves 12a-12c and the coupling elements 13a-13d is engaged.

The support 24 extracts the locking bolt 22 from the registering tooth space 20 shortly or immediately after the nut 6 is coupled to the feed screw 4. Thus, the parts of the coupling means and of the arresting means reassume the positions which are shown in FIG. 2. This enables the feed screw 4 to change the position of the component 2a and/or 2b while the position of the component 2c remains unchanged.

The apparatus comprises a discrete control unit 23 for each of the components 2a, 2b, 2c so that each of these components can be adjusted (by moving along the track 3 toward or away from the transmission 9) independently of the other two components, jointly with one of the other two components or jointly with each of the other two components.

It is further clear that the adjustments of one or more components can be automated by actuating the aforementioned motors for the supports 24 of the three control units 23 in accordance with a predetermined program. The program also ensures rotation of the feed screw 4 through angles of preselected magnitude at desired intervals and in synchronism with the operation of the control units. The program determines the timing of adjustment of one or more components, the direction of adjustment of each component and the extent of adjustment of each component.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for changing the position of at least one adjustable component, such as a tool or a tool holder in a machine tool, comprising a rotary feed screw having an axis of rotation; a motion receiving member for the adjustable component; a rotary nut mating with said feed screw and connected with said motion receiving member for movement therewith in the axial direction of said feed screw; engageable and disengageable coupling means for non-rotatably connecting said nut to said feed screw so that rotation of the feed screw does not entail a movement of the nut axially of the feed screw in engaged condition of said coupling means, said coupling means comprising axially parallel external grooves provided on said feed screw and coupling elements mounted on said nut for movement into and from said grooves; and engageable and disengageable arresting means for blocking rotation of said nut with said feed screw so that the nut and the motion receiving member move axially of the feed screw in response to rotation of the feed screw in engaged condition of said arresting means.

2. The apparatus of claim 1, further comprising means for engaging and disengaging said coupling means and said arresting means in a predetermined sequence so that engagement of said arresting means precedes disengagement of said coupling means and disengagement of said arresting means follows engagement of said coupling means.

3. The apparatus of claim 1, wherein said nut is rotatably journalled in said motion receiving member.

4. The apparatus of claim 1, wherein said feed screw has a circumference, said nut has an end face and said coupling elements are adjacent said end face and are spaced apart from each other in the circumferential direction of said feed screw.

5. The apparatus of claim 4, wherein said nut has a peripheral surface and further comprising means for biasing said coupling elements toward the peripheral surface of said feed screw.

6. The apparatus of claim 1, further comprising means for expelling said coupling elements from the grooves of said feed screw.

7. The apparatus of claim 7, wherein said expelling means includes means for simultaneously urging all of the coupling elements to positions outside of said grooves.

8. The apparatus of claim 7, wherein said coupling means further comprises a plurality of levers pivotably mounted on said nut, each lever having a first arm supporting one of said coupling elements and a second arm, said expelling means including an elastic member surrounding said levers and means for simultaneously engaging said elastic member with said second arm to thereby expel the coupling elements from the grooves of said feed screw.

9. The apparatus of claim 1, further comprising control means for engaging and disengaging said coupling means and said arresting means in a predetermined sequence.

10. The apparatus of claim 1, further comprising means for indexing said feed screw stepwise through angles of predetermined magnitude.

11. The apparatus of claim 10, further comprising control means arranged to engage and disengage at least one of said coupling and arresting means only after completion of indexing of the feed screw through at least one full angle of predetermined magnitude.

12. Apparatus for changing the position of at least one adjustable component, such as a tool or a tool holder in a machine tool, comprising a rotary feed screw having an axis of rotation; a motion receiving member for the adjustable component; a rotary nut mating with said feed screw and connected with said motion receiving member for movement therewith in the axial direction of said feed screw; engageable and disengageable coupling means for non-rotatably connecting said nut to said feed screw so that rotation of the feed screw does not entail a movement of the nut axially of the feed screw in engaged condition of said coupling means; engageable and disengageable arresting means for blocking rotation of said nut with said feed screw so that the nut and the motion receiving member move axially of the feed screw in response to rotation of the feed screw in engaged condition of said arresting means, said arresting means comprising an annulus of alternating teeth and tooth spaces and a bolt movable into and from selected tooth spaces, said coupling means comprising a plurality of axially parallel external grooves provided in said feed screw and a plurality of levers pivotably mounted on said nut and each having a first arm including a portion movable into and from said a groove of said feed screw and a second arm; means for simultaneously pivoting said levers to positions of disengagement from said feed screw including an elastic member surrounding said levers; and control means for engaging and disengaging said coupling means and said arresting means in a predetermined sequence, said control means including a mobile support for said bolt and means for tightening said elastic member around said levers so that the elastic member pivots the second arms of said levers in directions to expel said portions of the first arms from the grooves of said feed screw.

13. The apparatus of claim 12, wherein said tightening means is rigid with said support.

14. The apparatus of claim 12, wherein said control means comprises means for movably mounting said bolt on said support so that said tightening means is movable relative to said bolt and vice versa.

15. Apparatus for changing the position of at least one adjustable component, such as a tool or a tool holder in a machine tool, comprising a rotary feed screw having an axis of rotation; a motion receiving member for the adjustable component; a rotary nut mating with said feed screw and connected with said motion receiving member for movement therewith in the axial direction of said feed screw; engageable and disengageable coupling means for non-rotatably connecting said nut to said feed screw so that rotation of the feed screw does not entail a movement of the nut axially of the feed screw in engaged condition of said coupling means; engageable and disengageable arresting means for blocking rotation of said nut with said feed screw so that the nut and the motion receiving member move axially of the feed screw in response to rotation of the feed screw in engaged condition of said arresting means, said arresting means comprising an annulus of equidistant alternating neighboring teeth and neighboring tooth spaces on said nut and a locking bolt movable into and from selected tooth spaces; and means for indexing said feed screw stepwise through angles of predetermined magnitude corresponding to the angular spacing of neighboring tooth spaces.

16. Apparatus for changing the position of at least one adjustable component, such as a tool or a tool holder in a machine tool, comprising a rotary feed screw having an axis of rotation; a motion receiving member for the adjustable component; a rotary nut mating with said feed screw and connected with said motion receiving member for movement therewith in the axial direction of said feed screw; engageable and disengageable coupling means for non-rotatably connecting said nut to said feed screw so that rotation of the feed screw does not entail a movement of the nut axially of the feed screw in engaged condition of said coupling means; engageable and disengageable arresting means for blocking rotation of said nut with said feed screw so that the nut and the motion receiving member move axially of the feed screw in response to rotation of the feed screw in engaged condition of said arresting means; and means for indexing said feed screw stepwise through angles of predetermined magnitude, each of said angles equaling 360°/n wherein n is a whole number exceeding one, said arresting means including an annulus of n teeth and n tooth spaces alternating with said teeth and provided on said nut, and a locking bolt movable into and from selected tooth spaces.

17. Apparatus for changing the position of at least one adjustable component, such as a tool or a tool holder in a machine tool, comprising a rotary feed screw having an axis of rotation; a motion receiving member for the adjustable component; a rotary nut mating with said feed screw and connected with said motion receiving member for movement therewith in the axial direction of said feed screw; engageable and disengageable coupling means for non-rotatably connecting said nut to said feed screw so that rotation of the feed screw does not entail a movement of the nut axially of the feed screw in engaged condition of said coupling means; engageable and disengageable arresting means for blocking rotation of said nut with said feed screw so that the nut and the motion receiving member move axially of the feed screw in response to rotation of the feed screw in engaged condition of said arresting means; and means for indexing said feed screw stepwise through angles of predetermined magnitude, each of said angles equaling 360°/n, said coupling means comprising r axially parallel external grooves on said feed screw and s coupling elements mounted on said nut for movement into and from said grooves, n being equal r times s.

* * * * *